United States Patent [19]

Uno et al.

[11] Patent Number: 4,588,039
[45] Date of Patent: May 13, 1986

[54] VEHICLE STEERING CONTROL SYSTEM AND METHOD OF OPERATING SAME

[75] Inventors: Takaaki Uno, Zama; Yasuji Shibahata, Yokohama; Yasumasa Tsubota, Yokosuka, all of Japan

[73] Assignee: Nissan Motor Co., Ltd., Yokohama, Japan

[21] Appl. No.: 659,964

[22] Filed: Oct. 11, 1984

[30] Foreign Application Priority Data

Oct. 17, 1983 [JP] Japan .................................. 58-193932
Oct. 27, 1983 [JP] Japan ........................... 58-166839[U]

[51] Int. Cl.$^4$ ............................. B62D 5/06; B62D 7/06
[52] U.S. Cl. ..................................... 180/140; 180/141; 180/143
[58] Field of Search ...................... 180/140, 141, 143

[56] References Cited

U.S. PATENT DOCUMENTS

| 3,572,460 | 3/1971 | Berlich ................................. 180/140 |
| 4,105,086 | 8/1978 | Ishii et al. ........................ 180/143 X |
| 4,440,254 | 4/1984 | Shibahata et al. .................. 180/140 |
| 4,527,654 | 7/1985 | Shibahata et al. .................. 180/140 |

*Primary Examiner*—Richard E. Gluck
*Attorney, Agent, or Firm*—Leydig, Voit & Mayer, Ltd.

[57] ABSTRACT

A vehicle is equipped with a rear wheel control device including hydraulic actuators for controllably turning rear wheels under influence of hydraulic fluid supplied thereto from a hydraulic pump. Turning the rear wheels is made in one of first and second directions which are opposite to each other, in response to steering effort applied to a steering wheel. The change-over operation of the rear wheel turning between the first and second directions takes place upon substantially stopping supply of the hydraulic fluid to the actuators, thereby preventing shock during the turning direction change-over operation.

24 Claims, 20 Drawing Figures

VEHICLE STEERING CONTROL SYSTEM AND METHOD OF OPERATING SAME

BACKGROUND OF THE INVENTION

1. Field of the Invention

This invention relates to a vehicle steering control system and a method of operating the same system, and more particularly to an improvement in the vehicle steering control system capable of turning vehicle rear wheels in the same or opposite direction relative to vehicle front wheels and the operating the same system for the purpose of attaining high vehicle cornering performance.

2. Description of Prior Art

In order to improve cornering performance of modern automotive vehicles, a vehicle steering control system in which both front and rear wheels are steerable or turnable has been proposed which is disclosed, for example, as "a compliance steer control system" in U.S. Pat. No. 4,440,254 issued on Apr. 3, 1984 in the name of Shibahata et al.

This compliance steer control system is composed of hydraulic actuators incorporated with elastomeric insulators interposed between a rear suspension member and a vehicle body. The hydraulic actuators are controllably actuated by hydraulic fluid being supplied to a power cylinder of a power steering system for the front wheels. As a result, the rear wheels are turned in the same or opposite direction relative to the turning of the front wheels. This accomplishes a control to decrease or increase so-called compliance steer of the rear wheels caused during vehicle cornering.

Furthermore, in order to improve vehicle cruising stability and cornering performance the compliance steer control system has been employed to provide a change-over in turning directions of the rear wheels, i.e., the same or opposite turning direction relative to the turning direction of the front wheels, in response to vehicle speed. However, drawbacks have been encountered in the above mentioned compliance steer control system when the hydraulic actuators for the rear wheels continue receiving a certain amount of hydraulic fluid when the change-over operation takes place. This excessive supplied fluid may cause shock during the change-over operation.

SUMMARY OF THE INVENTION

A vehicle steering control system of the present invention includes a rear wheel control device for controllably turning rear wheels of a vehicle in either one of first and second directions under influence of hydraulic fluid from a hydraulic pump in response to steering effort applied to a steering wheel. The first and second directions are opposite to each other relative to their neutral position in which the steering wheel is in its straight ahead position. A flow control device is provided to change the flow characteristics of the hydraulic fluid by substantially stopping the fluid supply from the hydraulic pump to the rear wheel control device. A vehicle steering control system is arranged to change the turning direction of the rear wheels between the first and second directions upon detecting that the supply of the hydraulic fluid to the rear wheel control device is substantially stopped under the action of the flow control device.

Accordingly, the turning direction of the rear wheels can be controlled to be in the same or opposite direction relative to the turning of the front wheels in response to a vehicle operating parameter, thereby to attain high vehicle cruising stability and cornering performance. Furthermore, since the change-over operation of rear wheel turning directions takes place when the rear wheel control device is disabled even upon the rotation of the steering wheel, abrupt change in vehicle cornering characteristics is effectively prevented during rotation of the steering wheel, thus securing vehicle stability during cornering.

BRIEF DESCRIPTION OF THE DRAWINGS

The features and advantages of the vehicle steering control system and the method of operating the same will be more clearly appreciated from the following description taken in conjunction with the accompanying drawings in which like reference numerals designate corresponding parts and elements, in which.

DETAILED DESCRIPTION OF THE INVENTION

Figure 1:
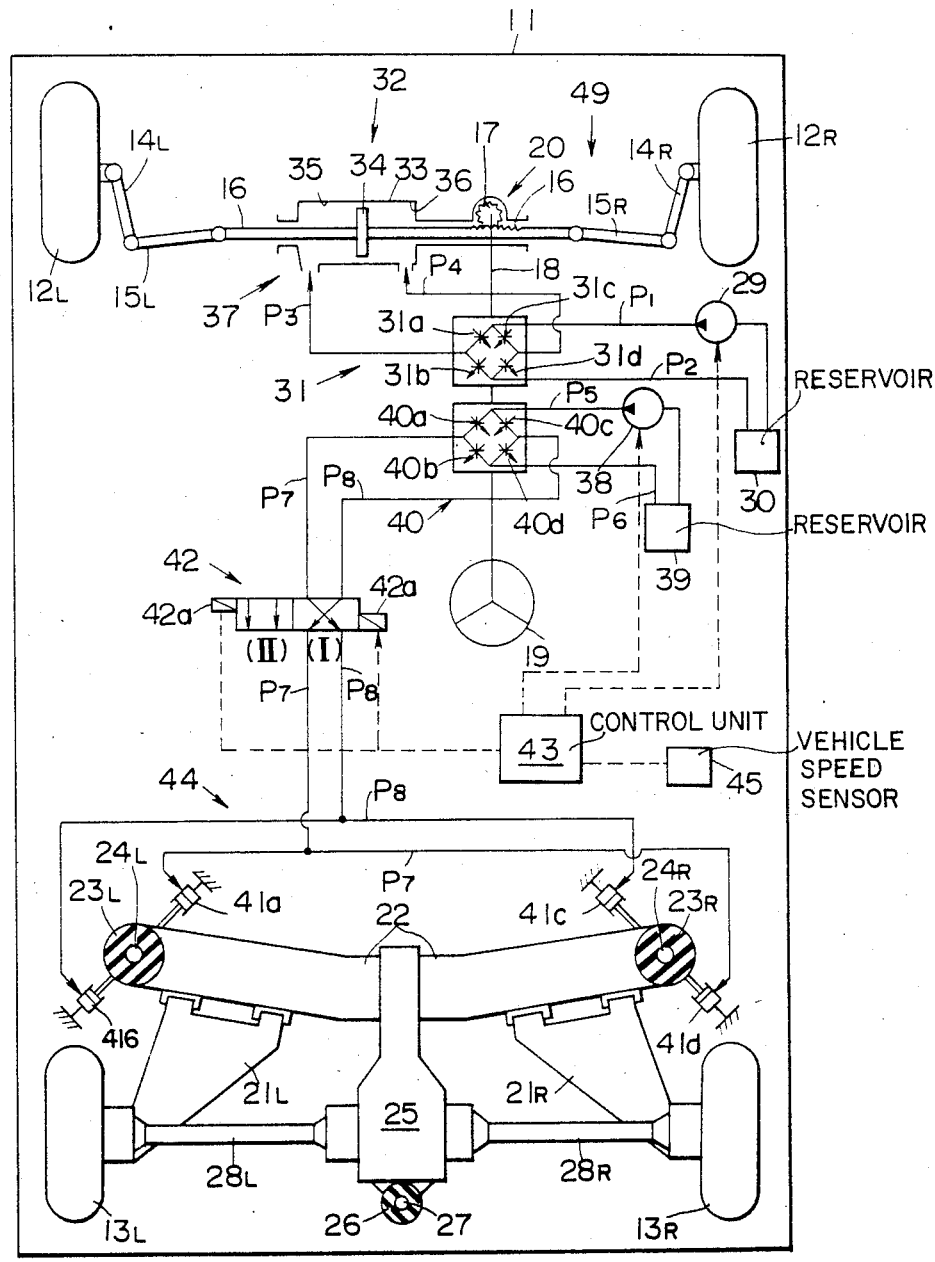
FIG. 1 is a schematic plan view of a first embodiment of the vehicle steering control system according to the present invention.

Referring now to FIG. 1, a first embodiment of a steering system according to the present invention is illustrated. In this embodiment, the steering system is shown to be incorporated with, for example, an automotive vehicle whose body is designated by the reference numeral 11. The steering system comprises steerable front wheels 12L, 12R and rear wheels 13L, 13R which are all rotatably mounted to the vehicle body 11. The front wheels 12L, 12R are respectively connected with the opposite ends of a tie rod or rack (rack gear) 16 through knuckle arms 14L, 14R and side rods 15L, 15R. The rack 16 meshes with a pinion 17 which is connected through a steering shaft 18 to a steering wheel 19. The rack 16 and the pinion 17 constitute a conventional steering gear denoted as numeral 20.

The rear wheels 13L, 13R are pivotally supported to a rear suspension member 22 through semi-trailing arms 21L, 21R, respectively. The rear suspension member 22 is elastically supported at its opposite ends on the vehicle body 11 through elastomeric insulators 23L, 23R. As shown, each of pins 24L, 24R secured to the vehicle body 11 is disposed at the central part of the elastomeric insulator 23R, 23L in such a manner that the rear suspension member 22 is insulated from each pin 24L, 24R. A differential gear housing 25 is secured to the rear suspension member 22 by means of bolts (not shown). This differential gear housing 25 is also elastically supported to the vehicle body 11 through an elastomeric insulator 26. A pin 27 secured to the vehicle body 11 is disposed at the central part of the elastomeric insulator 26 so that the differential gear housing is insulated from the pin 27. The differential gear (not shown) in the housing 25 is connected through drive shafts 28R, 28L with the rear wheels 13L, 13R, respectively.

A first hydraulic pump 29 is electrically connected to a control unit 43 so as to be controlled in its discharge amount, and adapted to pressurize hydraulic fluid from a reservoir 30 and discharge the pressurized hydraulic fluid to a first control valve 31 operatively associated with the steering shaft 18. The first control valve 31 is fluidly connected through a hydraulic line $P_1$ with the first hydraulic pump 29 and fluidly connected through a hydraulic line $P_2$ with the reservoir 30. The first control valve 31 is additionally fluidly connected through hydraulic lines $P_3$ and $P_4$ with a power cylinder 32. The first control valve 31 has four variable orifices 31a, 31b, 31c, 31d each of which is so adapted that its flow passage area is variable in response to the rotation of the steering wheel 19, i.e., the steering effort applied to the steering wheel 19, thus controlling the hydraulic fluid discharged from the first hydraulic pump 29 in accordance with the rotation of the steering wheel 19 so that the controlled hydraulic fluid is supplied to the power cylinder 32.

The power cylinder 32 includes a cylinder body 33 fixedly mounted to the vehicle body 11. A piston 34 is securely connected to the rack 16 and slidably movably disposed within the cylinder body 33 to define two fluid chambers 35, 36 on the opposite sides thereof. The power cylinder 32 develops a steering assist power depending upon the pressure difference between the fluid chambers 35, 36 supplied with the hydraulic fluids through the first control valve 31, thereby forcing the rack 16 in the widthwise direction of the vehicle body 11 to steer the vehicle. The first pump 29, the reservoir 30, the first control valve 31, and the power cylinder 32 constitute a power steering system 37 which is known per se and functions to develop the steering assist power in accordance with the rotation of the steering effort applied to the steering wheel 19 thereby to power-assist the operation of the steering wheel 19. The power steering system 37 and the steering gear 20 constitute a front wheel operating means 49.

Similarly, a second hydraulic pump 38 is electrically connected to the control unit 43 so as to be controlled in its discharge amount, and adapted to pressurize hydraulic fluid from a reservoir 39 and to discharge the thus controlled hydraulic fluid to a second control valve 40. The second control valve 40 is operatively associated with the steering shaft 18 and fluidly connected through a hydraulic line $P_5$ with the second hydraulic pump 38 while being connected through a hydraulic line $P_6$ with the reservoir 39. The second control valve 40 is additionally fluidly connected through hydraulic lines $P_7$ and $P_8$ with four actuators 41a, 41b, 41c, 41d each of which is mechanically interposed between the vehicle body 11 and the rear suspension member 22. Each actuator 41a, 41b, 41c, 41d is of a hydraulic cylinder type and includes a cylinder section (not identified) pivotally connected to the vehicle body 11 by means of a pin joint. A piston section (not identified) is slidably movably disposed within the cylinder section and pivotally connected to the rear suspension member 22 by means of a pin joint. The second control valve 40 also has four variable orifices 40a, 40b, 40c, 40d each of which is so adapted that its flow passage area is variable in response to the rotation of the steering wheel 19 or the steering effort applied to the steering wheel 19, thus controlling the hydraulic fluid discharged from the second hydraulic pump 38 in accordance with the rotation of the steering wheel 19 to supply the thus controlled hydraulic fluid to the actuators 41a, 41b, 41c, 41d. The actuators 41a, 41b, 41c, 41d function to distort the elastomeric insulators 23R, 23L under the influence of the hydraulic fluid to be supplied thereto, thus causing the rear suspension member 22 to pivotally move around the pin 27. Such a movement of the rear suspension member 22 causes the rear wheels 13L, 13R to turn to steer the vehicle. The second pump 38, the reservoir 39, the second control valve 40, and the actuators 41a, 41b, 41c, 41d constitute a rear wheel control means 44. A rear wheel control means 44 is disclosed in detail in U.S. Pat. No. 4,440,254 and therefore the detailed explanation thereof will be omitted for the purpose of simplicity of illustration.

In keeping with an aspect of the invention, a solenoid operated directional control valve 42 is fluidly disposed in the lines $P_7$, $P_8$. The directional control valve 42 is provided with solenoids 42a which are electrically connected to the control unit 43 in order to carry out flow directional control in the lines $P_7$, $P_8$ under the control of the control unit 43. The directional control valve 42 has a first position or state I in which the line $P_7$ upstream of the valve 42 is in fluid communication with the line $P_8$ downstream of the valve 42 while the line $P_8$ upstream of the valve 42 is in fluid communication with the line $P_7$ downstream of the valve 42, and a second position or state II in which the lines $P_7$ and $P_8$ upstream of the valve 42 are in fluid communication with the lines $P_7$ and $P_8$ downstream of valve 42, respectively. The directional control valve 42 is adapted to take the second position II when the solenoids 42a are energized.

Figure 2:
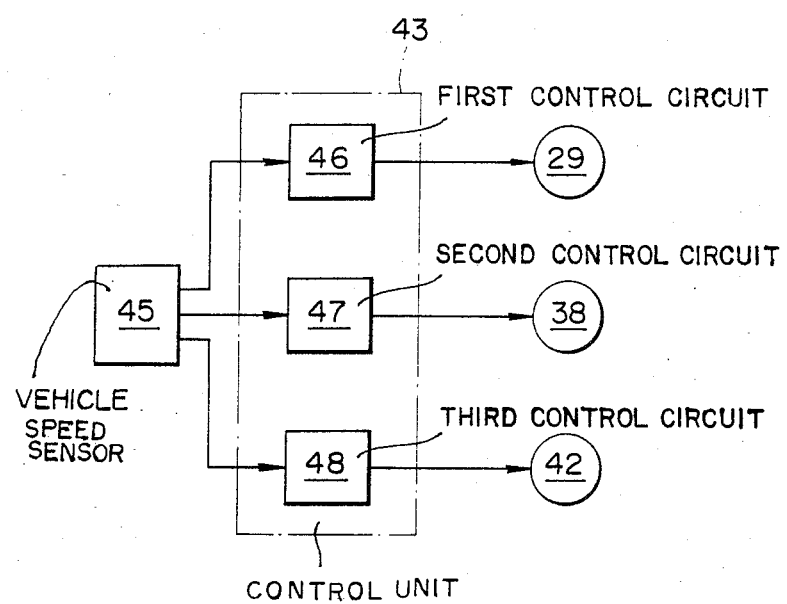
FIG. 2 is a diagram showing a circuit arrangement of a control unit used in the system of FIG. 1.
Figure 3A:
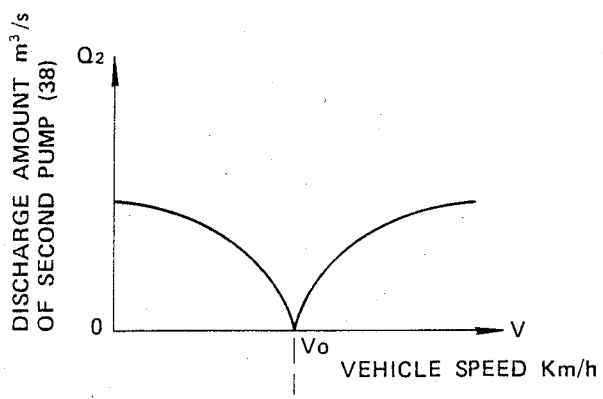
FIGS. 3A, 3B and 3C are graphs showing a manner of operation of the system of FIG. 1 in terms of vehicle speed.
Figure 3B:
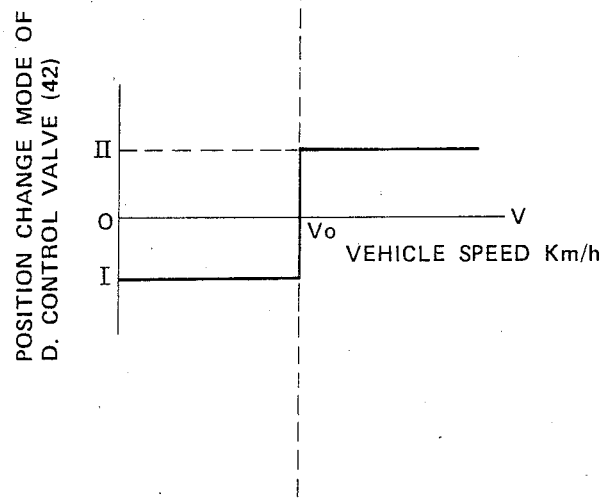

A control means herein shown as a control unit 43 is electrically connected to a vehicle speed detecting means, herein shown as a vehicle speed sensor 45, and inputs a signal representative of a vehicle speed V from the vehicle speed sensor 45. The control unit 43 controls the first hydraulic pump 29, the second hydraulic pump 38, and the solenoid operated directional control valve 42 in accordance with the vehicle speed V. The control unit 43 is, for example, arranged as shown in FIG. 2. As shown in FIG. 2, the control unit 43 includes a first control circuit 46 driving the first hydraulic pump 29 in accordance with the vehicle speed V and controlling the hydraulic pump 29 in a manner that the discharge amount from the pump becomes smaller in a high vehicle speed range (not lower than a predetermined vehicle speed level $V_0$) than in a lower vehicle speed range (lower than the predetermined level $V_0$). The control unit 43 also includes a second control circuit 47, driving the second hydraulic pump 38 in accordance with the vehicle speed V and controlling the hydraulic pump 38 in a manner as shown in FIG. 3A. The control unit 43 further includes a third control circuit 48 which energizes and de-energizes the solenoids 42a of the directional control valve 42 in accordance with the vehicle speed V in a manner as shown in FIG. 3B in which the directional control valve 42 takes the first position I in the low vehicle speed range while obtaining the second position II in the high vehicle speed range. It is preferable that the above-mentioned predetermined vehicle speed level $V_0$ is between 30 Km/h and 60 Km/h.

The manner of operation of the thus configurated vehicle steering control system of FIG. 1 will be discussed hereinafter.

In this vehicle steering control system, the front wheels 12L, 12R and the rear wheels 13L, 13R are controllably turned in response to the rotation of the steering wheel 19 in which the turning direction and the turning angle (relative to the steering effort applied to the steering wheel) of the rear wheels are controlled in accordance with the vehicle speed V.

Now, in the low vehicle speed range lower than the predetermined vehicle speed $V_0$, when the steering wheel 19 is rotated right, the steering effort applied to the steering wheel 19 is transmitted through the steering gear 20 to the front wheels 12L, 12R, thereby turning or displacing the front wheels 12L, 12R to the right. At this time, the first control valve 31 for the power steering system 37 is brought into a state in which the flow passage area of the variable orifices 31a, 31d is narrowed while the flow passage area of the variable orifices 31b, 31c is widened in accordance with the steering effort applied to the steering wheel 19, thereby controlling the hydraulic fluid discharged from the first hydraulic pump 29 in accordance with the steering effort. The thus controlled hydraulic fluid is supplied to the power cylinder 32. As a result, the fluid chamber 36 of the power cylinder 32 is supplied with the hydraulic fluid of a higher pressure while the fluid chamber 35 is supplied with the hydraulic fluid of a lower pressure, so that a pressure difference is made between the fluid chambers 35, 36 to develop a steering assist power, forcing the rack 16 in the widthwise direction of the vehicle body 11. This turns the front wheels 12L, 12R in a direction to steer the vehicle rightward while reducing the steering effort required for the steering. It will be understood that since the discharge amount of the first hydraulic pump 29 is controlled to be increased at a lower vehicle speed, the power cylinder 32 develops a relatively great steering assist power.

Similarly, the second control valve 40 for the compliance steer control system 44 is brought into a state in which the flow passage area of the variable orifices 40a, 40d is narrowed while the flow passage area of the variable orifices 40b, 40c is widened in accordance with the steering effort applied to the steering wheel 19, so that a higher pressure prevails in the line $P_8$ while a lower pressure prevails in the line $P_7$. In this low vehicle speed range, the discharge amount $Q_2$ of the second hydraulic pump 38 is controlled to gradually decrease as the vehicle speed V increases toward the vehicle speed level $V_0$, and the directional control valve 42 is in the first position I. Accordingly, the actuators 41a, 41d are supplied with the hydraulic fluid of a higher pressure while the actuators 41b, 41c are supplied with the hydraulic fluid of a lower pressure, so that the rear suspension member 22 is pivotally moved counterclockwise around the pin 27, thereby turning the rear wheels 12L, 12R to the left, i.e., in the opposite direction to turning of the front wheels 12L, 12R. Accordingly, the cornering characteristics of the vehicle is brought into an oversteer side, so that the turning radius of the vehicle is minimized. In this low vehicle speed range, since the discharge amount $Q_2$ of the second hydraulic pump 38 is controlled in the manner as shown in FIG. 3A, the turning angle (deg/Kg) of the rear wheels 13L, 13R relative to the steering effort applied to the steering wheel 19 becomes larger as the vehicle speed V becomes smaller as shown in FIG. 3C.

Figure 3C:
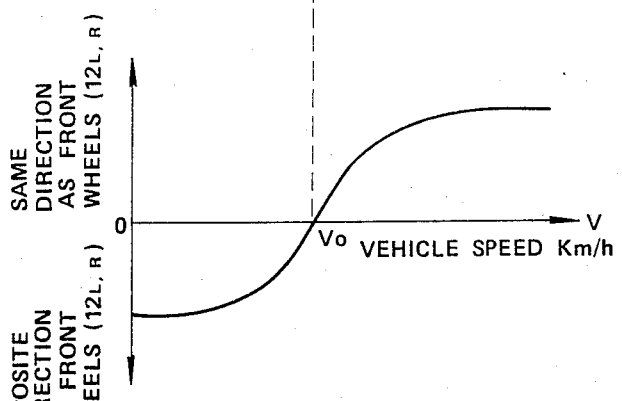

Subsequently, when vehicle speed has increased to the predetermined vehicle speed level $V_0$, the discharge amount of the second hydraulic pump 38 becomes nearly zero, so that the turning angle of the rear wheels 13L, 13R relative to the turning effort applied to the steering wheel 19 becomes zero as shown in FIG. 3C. In other words, even upon rotation of the steering wheel 19, the rear wheels 13L, 13R are not turned. Here, the directional control valve 42 takes the second position II upon energization of the solenoids 42a, as shown in FIG. 3B. Then, even if the steering wheel 19 has been rotated, the rear wheels 13L, 13R are not turned as mentioned above and therefore abrupt change in steering characteristics is not made, thereby to attain vehicle cruising stability during speed cornering.

When the vehicle cruises in the high vehicle speed range not lower than the predetermined level $V_0$, the directional control valve 42 is in the second position II as shown in FIG. 3B. Consequently, when the steering wheel 19 is rotated right, the actuators 41b, 41c are supplied with the higher pressure hydraulic fluid while the actuators 41a, 41d are supplied with the lower pressure hydraulic fluid, so that the rear suspension member 22 is pivotally moved clockwise around the pin 27, thereby turning the rear wheels 13L, 13R to the right or in the same direction as the turning of the front wheels 12L, 12R. This improves cornering performance of the vehicle at high vehicle speeds. Additionally, in the high vehicle speed range, the discharge amount $Q_2$ of the second hydraulic pump 38 is controlled to gradually increase as vehicle speed V increases, and therefore the turning angle of the rear wheels 13L, 13R relative to the steering effort increases in the same direction as the turning of the front wheels 12L, 12R with the increased vehicle speed, as shown in FIG. 3C. This enables much more stable cornering of the vehicle.

As appreciated from the above discussion, according to the first embodiment, the rear wheels are turned in the opposite direction to the front wheels in the low vehicle speed range while in the same direction as the front wheels in the high vehicle speed range, thereby setting the cornering characteristics of the vehicle on oversteer side in the low vehicle speed range while on understeer side in the high vehicle speed range. Accordingly, the turning radius of the vehicle can be minimized at low vehicle speeds while enabling stable cornering at high vehicle speeds, thus improving vehicle moving performance. In addition, change of the turning direction of the rear wheels is carried out upon rendering zero the flow amount of the hydraulic fluid to be supplied to the rear wheel control means, i.e., after the rear wheels have not turned even if the steering wheel is rotated. Consequently, the vehicle is prevented from abrupt change in cornering characteristics during rotation of the steering wheel, thereby maintaining stable cornering performance.

Figure 4:
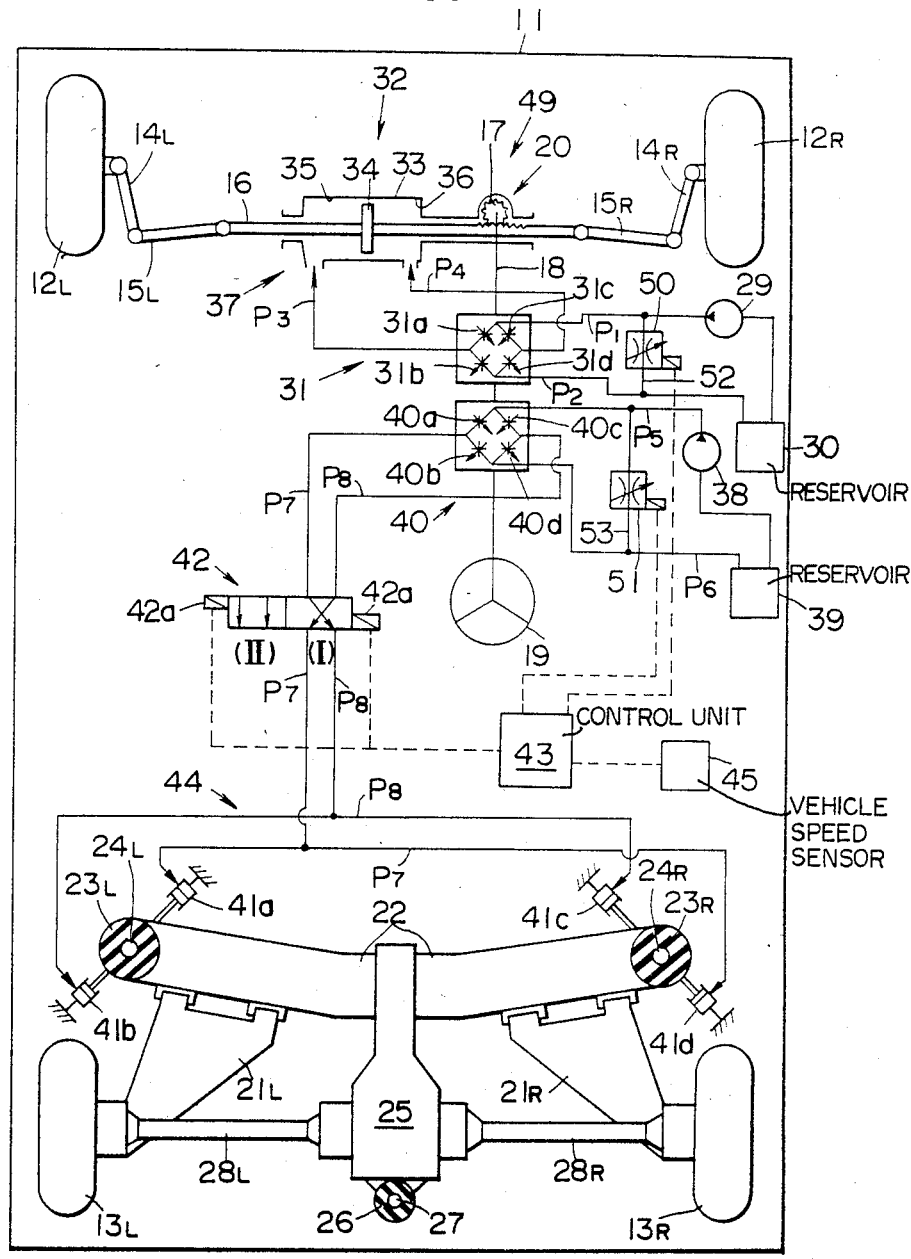
FIG. 4 is a schematic plan view similar to FIG. 1, but showing a second embodiment of the vehicle steering control system according to the present invention.

FIG. 4 illustrates a second embodiment of the vehicle steering control system of the present invention which is similar to the first embodiment except for addition of flow control valves. In this embodiment, a first flow control valve 50 is disposed in a first bypass line 52 for establishing fluid communication between the line $P_1$ and the line $P_2$, in order to allow the hydraulic fluid discharged from the first hydraulic pump 29 (whose discharge amount may not be controlled) to return to the reservoir 30. Additionally, a second flow control valve 51 is disposed in a second bypass line 53 for establishing fluid communication between the line $P_5$ and the line $P_6$, in order to allow the hydraulic fluid discharged from the second hydraulic pump 38 (whose discharge amount may not be controlled) to return to the reservoir 30.

The first and second flow control valves 50, 51 are of a pressure-compensated type and electrically connected to the control unit 43 to be controlled in response to the vehicle speed V. More specifically, the first flow control valve 50 is so controlled that the flow amount of the hydraulic fluid to return through the first bypass line 52 increases at the high vehicle speed range as compared with at the low vehicle speed range, under the control of the control unit 43. In other words, the first flow control valve 50 functions to decrease the flow amount of the hydraulic fluid to be supplied to the first control valve 31 at the high vehicle speed range, thereby decreasing the steering assist power developed in the power steering system 37 at the high vehicle speed range. The second flow control valve 51 is adapted to control the flow amount of the hydraulic fluid supplied from the second hydraulic pump 38 to the second control valve 40 in accordance with the characteristics as shown in FIG. 3A. In other words, the second flow control valve 51 functions to control the turning angle of the rear wheels 13L, 13R relative to the steering effort applied to the steering wheel 19 in accordance with the vehicle speed V.

Figure 5A:
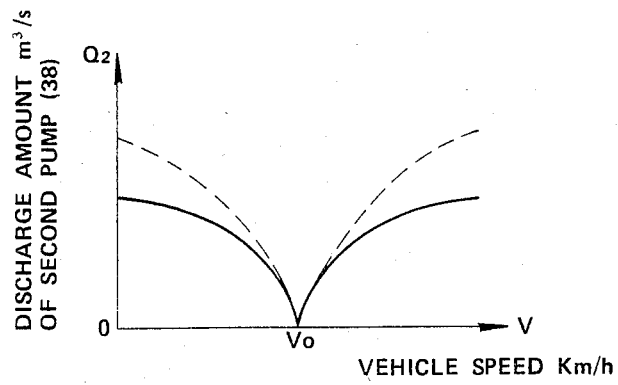
FIGS. 5A, 5B and 5C are graphs showing another manner of operation of the system of FIG. 1 in terms of vehicle speed.
Figure 5B:
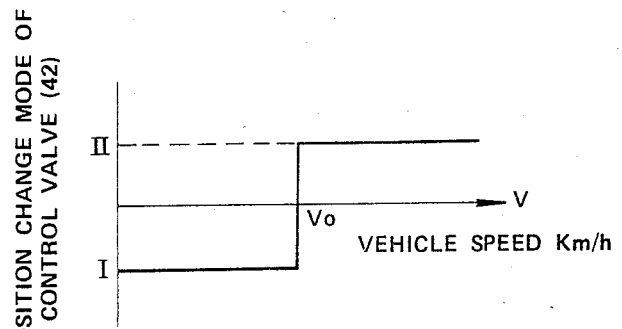
Figure 5C:
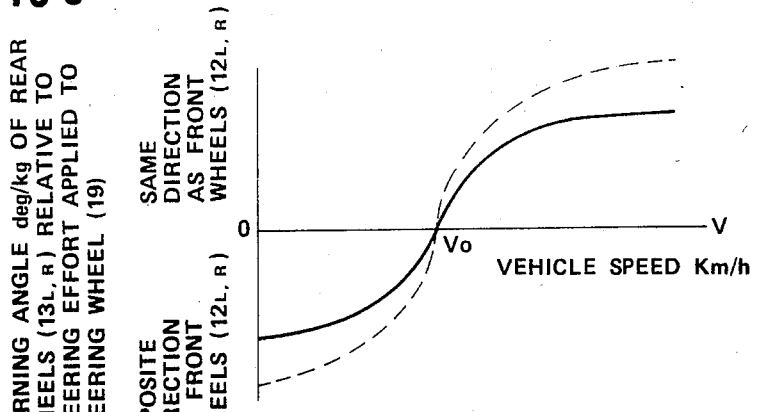

FIGS. 5A, 5B and 5C show another control manner (for the discharge amount of the second hydraulic pump 38, the position change mode in the directional control valve 42, and the turning angle of the rear wheels relative to the steering effort applied to the steering wheel 19) of the vehicle steering control system of FIG. 1, slightly different from the control manner as shown in FIG. 3A, 3B and 3C. In this control manner, the turning angle of the rear wheels 13L, 13R relative to the steering effort applied to the steering wheel 19 is adjustable upon increasing or decreasing the flow amount $Q_2$ of the hydraulic fluid to be supplied to the second control valve 40. More specifically as shown in FIGS. 5A, 5B and 5C, the flow amount of the hydraulic fluid to be supplied to the second control valve 40 is, for example, manually adjusted within a range indicated between a solid line and a broken line, thereby changing the turning angle of the rear wheels 13L, 13R relative to the steering effort applied to the steering wheel 19. According to this control manner, it is possible to obtain a desired vehicle steering characteristics, therey facilitating installation of this vehicle steering control system to different kinds of vehicles. This enables the vehicle steering control system of the present invention to be widely used.

Figure 6:
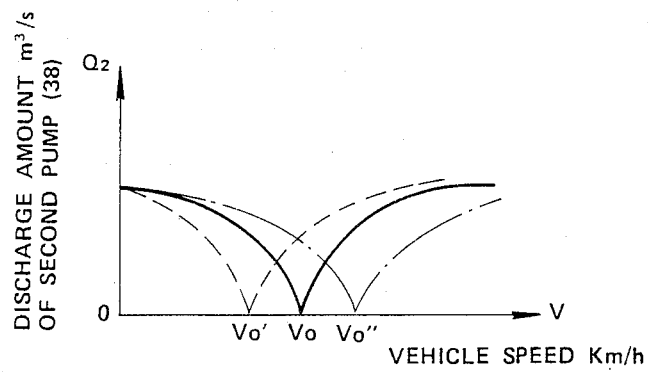
FIGS. 6A, 6B and 6C are graphs showing a further manner of operation of the system of FIG. 1.
Figure 6:
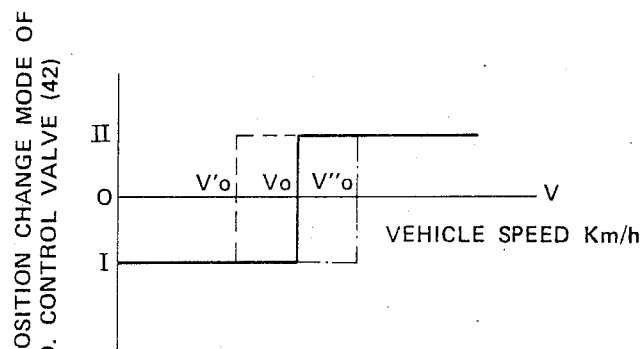
Figure 6:
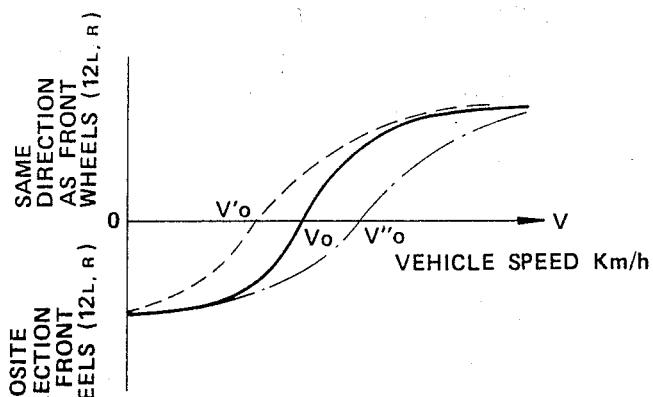

FIGS. 6A, 6B and 6C show a further control manner of the vehicle steering control system in which the flow amount of the hydraulic fluid to be supplied to the second control valve 40 is set to be increasable or decreasable, and additionally the predetermined vehicle speed level $V_0$ at which the hydraulic fluid flow amount $Q_2$ is substantially zero is adjustable (for example, manually) within a predetermined range ($V_0' \leq V_0 \leq V_0''$), for example, between 30 km/h and 60 Km/h. According to this control manner, the turning angle of the rear wheels 13L, 13R relative to the steering effort applied to the steering wheel 19 is adjustable within ranges indicated between a solid line and broken lines as shown in FIG. 6C, which increases freedom in selection of steering control characteristics.

Figure 7:
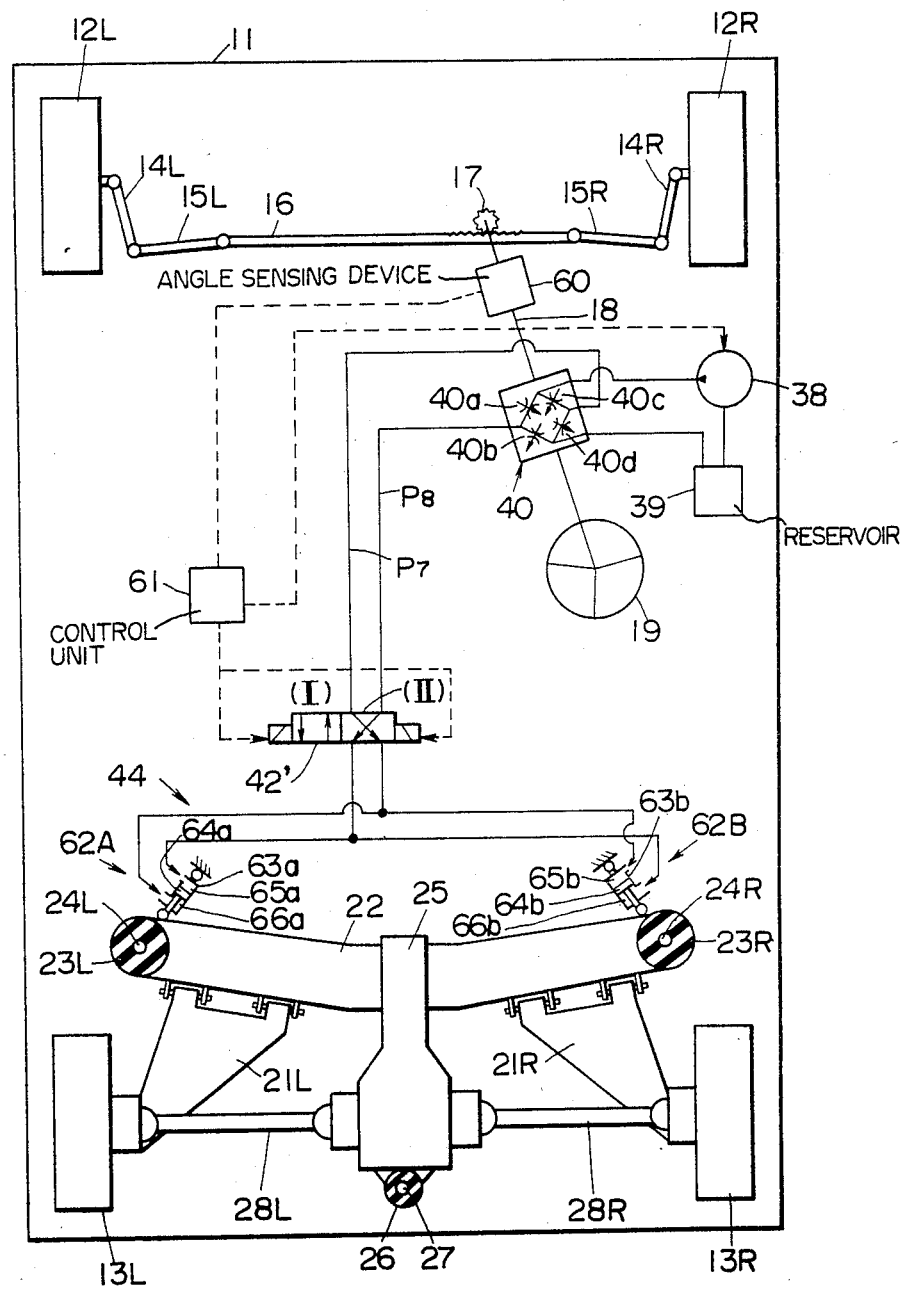
FIG. 7 is a schematic plan view of a third embodiment of the vehicle steering control system according to the present invention.

FIG. 7 illustrates a third embodiment of the vehicle steering control system of the present invention which is similar to the first embodiment but provided with no power steering system. In this embodiment, a steering angle sensing device 60 is provided to incorporate or operatively associated with the steering shaft 18 in such a manner as to sense the steering or rotation angle of the steering wheel 19 (for example, relative to the straight ahead position of the steering wheel 19) to generate an electric signal representative of the steering angle. The steering angle sensing device 60 is electrically connected to a control unit 61 which is arranged to generate a signal for changing two positions I and II of a solenoid operated directional control valve 42', in response to the signal from the steering angle sensing device 60.

First and second hydraulic cylinders 62A, 62B are provided between the vehicle body 11 and the rear suspension member 22 for the purpose of pivotally moving the rear suspension member 22 around the pin 27 for the differential gear housing 25. The first hydraulic cylinder 62A is made up of a cylinder section 63a in which a pistion 64a is slidably movably disposed to define first and second fluid chambers 65a, 66a on the opposite sides thereof. The cylinder section 63a is connected with the vehicle body 11 by means of a pin joint, while the piston 64a is connected with the rear suspension member 22 at one end portion provided with the elastomeric insulator 23L, by means of a pin joint. The hydraulic cylinder 62B is made up of a cylinder section 63b in which a piston 64b is slidably movably disposed to define the fluid chambers 65b, 66b on the opposite sides thereof. The cylinder section 63b is connected to the vehicle body 11 by means of a pin joint. The piston 64b is connected to the rear suspension member 22 at the other end portion provided with the elastomeric insulator 23R, by means of a pin joint. The fluid chamber 65a of the first hydraulic cylinder 62A and the fluid chamber 66b of the second hydraulic cylinder 62B are fluidly connected through the directional control valve 42' to the control valve 40 by means of the lines $P_7$, $P_8$.

The operation of the thus arranged system of FIG. 7 will be discussed hereinafter with reference to FIGS. 8 and 9.

Figure 8:
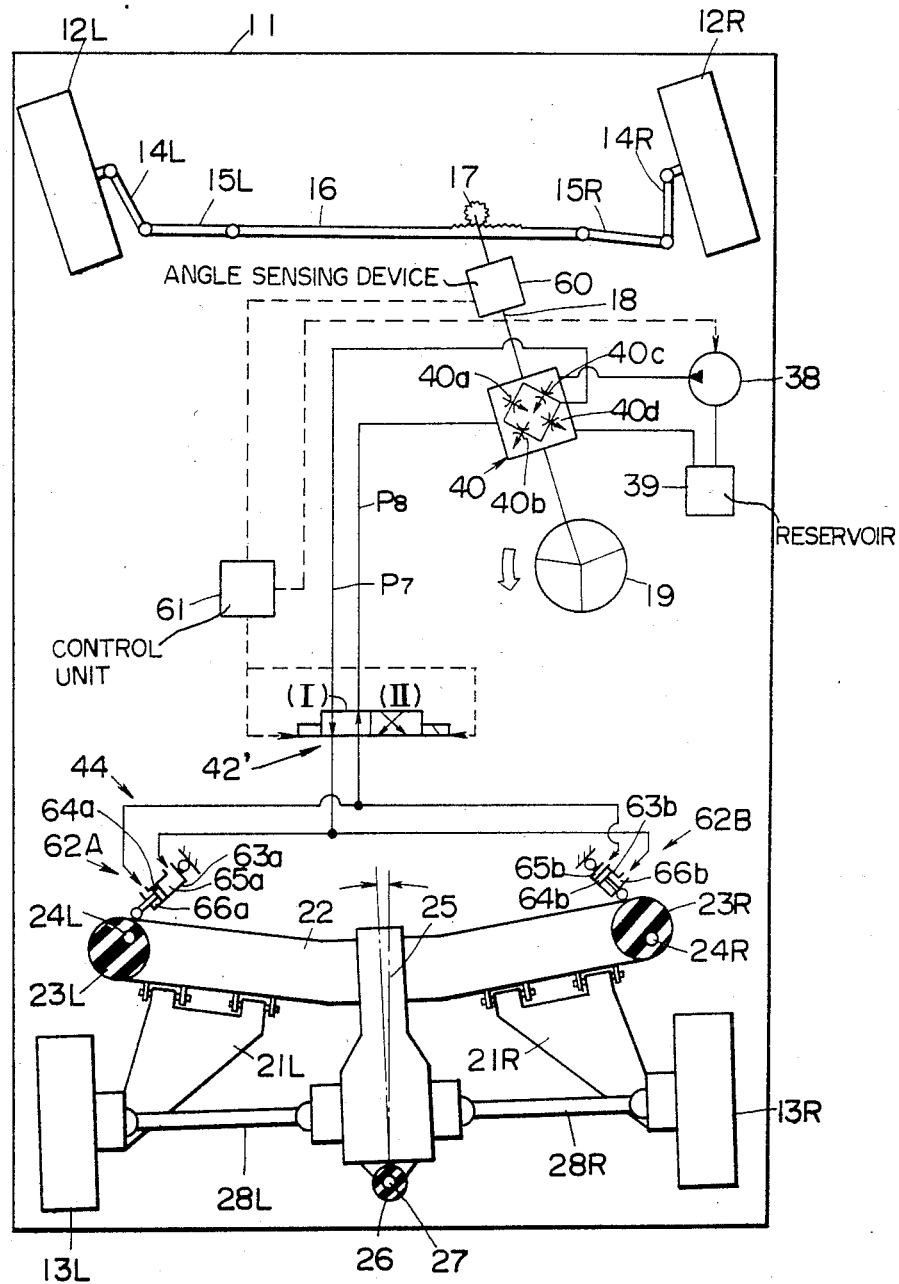
FIGS. 8 and 9 are schematic plan views similar to FIG. 7, but illustrating operation of the system of FIG. 7.
Figure 12A:
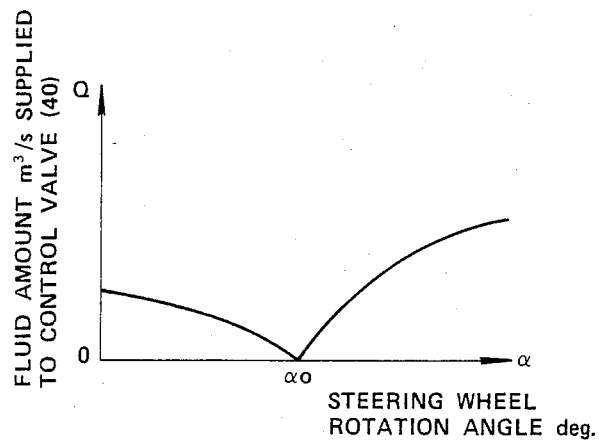
FIGS. 12A, 12B and 12C are graphs showing a manner of operation of the system of FIG. 7 in terms of rotation angle of a steering wheel.
Figure 12B:
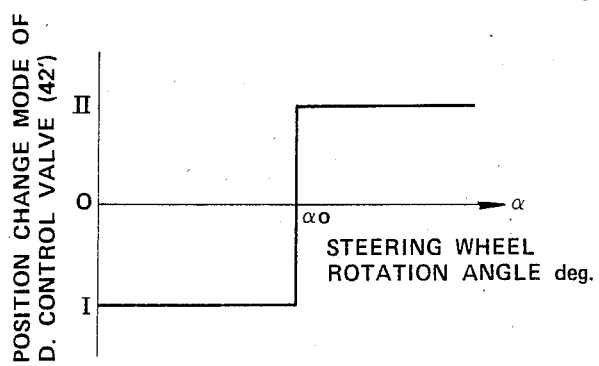

Now, when the steering wheel 19 is rotated left or counterclockwise as shown in FIG. 8 in which the rotation angle of the steering wheel is smaller than a predetermined angle $\alpha_0$, the flow passage area of the variable orifices 40b, 40c is narrowed while the flow passage area of the variable orifices 40a, 40d is widened, so that the hydraulic fluid of a higher pressure is supplied through the line $P_7$ to the fluid chamber 65a of the first hydraulic cylinder 62A and the fluid chamber 66b of the second hydraulic cylinder 62B because the directional control valve 42' is in the first position I as shown in FIG. 12B. The hydraulic fluid of a lower pressure is supplied through the line $P_8$ to the fluid chamber 66a of the first hydraulic cylinder 62A and the fluid chamber 65b of the second hydraulic cylinder 62B. As a result, the piston 64a of the first hydraulic cylinder 62A is moved to push the rear suspension member 22 while the piston 64b of the second hydraulic cylinder 62B is moved to pull the rear suspension member 22 so as to distort the elastomeric insulators 23L, 23R as shown in FIG. 8. Accordingly, the rear wheels 13L, 13R are turned left or counterclockwise around the pin 27, thereby contributing to steering the vehicle to understeer side. At this time, the hydraulic pump 38 is so controlled that the discharge amount thereof gradually decreases as the steering wheel rotation angle approaches the predetermined angle $\alpha_0$ as shown in FIG. 12A, under the control of the control unit 61 and in response to the signal from the steering angle sensing device 60. When the steering wheel rotation angle becomes the predetermined level $\alpha_0$, the discharge amount of the hydraulic pump 38 becomes substantially zero. Consequently, the pressure difference between the two fluid chambers of each hydraulic cylinder 62A, 62B becomes smaller, so that the piston of each hydraulic cylinder takes its neutral postion, thereby making zero the turning angle of the rear wheels 13L, 13R relative to the rotation angle of the steering wheel 19. At the same time, the first position I of the directional control valve 42' is changed into the second position II as shown in FIG. 12B.

When the rotation angle of the steering wheel 19 exceeds the predetermined level $\alpha_0$, the control unit 61 controls the hydraulic pump 38 in such a manner that the discharge amount of the pump gradually increases as the rotation angle of the steering wheel 19 increases. Accordingly, when the rotation angle of the steering wheel 19 is in the vicinity of the predetermined level $\alpha_0$, the rear wheels 13L, 13R are substantially in their neutral position or in parallel with the longitudinal axis of the vehicle body 11 as shown in FIG. 7 even if the steering wheel 19 is slightly rotated right or left.

Figure 9:
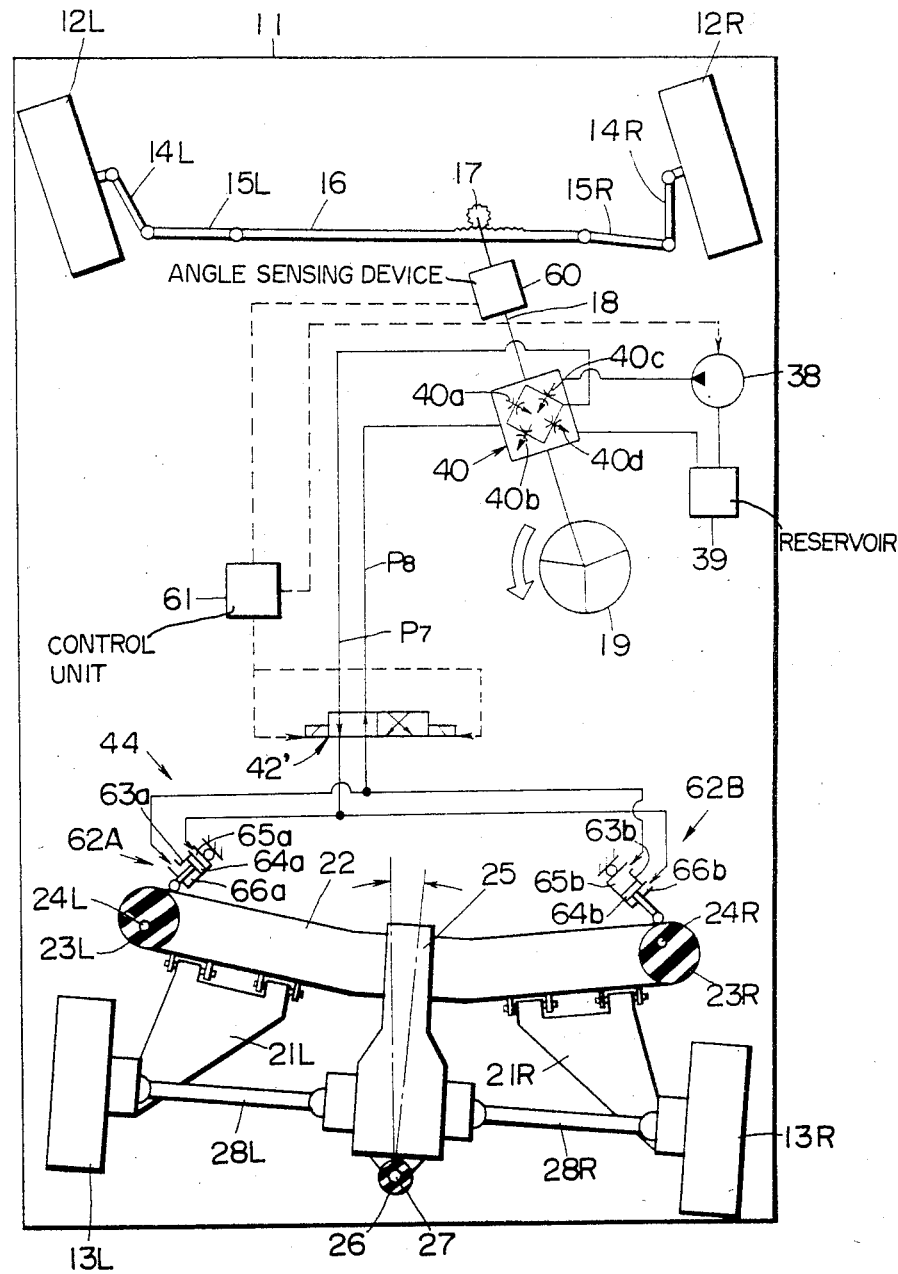
Figure 12C:
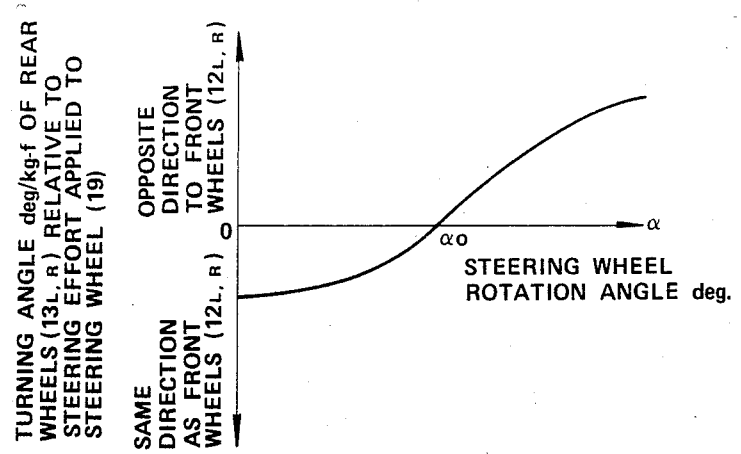

When the steering wheel 19 is further largely rotated left or counterclockwise over the predetermined level $\alpha_0$ as shown in FIG. 9, the control unit 61 puts the directional control valve 42' in the second position II as shown in FIG. 9. As a result, the fluid chamber 66a of the first hydraulic cylinder 62A and the fluid chamber 65b of the second hydraulic cylinder 62B are supplied with the higher pressure hydraulic fluid while the fluid chamber 65a of the first hydraulic cylinder 62A and the fluid chamber 66b of the second hydraulic cylinder 62B are supplied with the lower pressure hydraulic fluid, thus turning the rear wheels 13L, 13R in the opposite direction to in the case of FIG. 8 thereby to contribute to steer the vehicle to oversteer side. In this case, the flow amount of the hydraulic fluid to be supplied from the hydraulic pump 38 to the control valve 40 can be larger within a small steering angle range wherein steering rotation angle is smaller than the predetermined level $\alpha_0$, than that within a large steering angle range wherein steering wheel rotation angle is not smaller than the predetermined level $\alpha_0$ as shown in FIG. 12A, so that the turning angle of the rear wheels 13L, 13R is larger in case the rear wheels are turned in the opposite direction to the front wheels 12L, 12R, than that in case the rear wheels are turned in the same direction as the front wheels 12L, 12R as shown in FIG. 12C.

Figure 10:
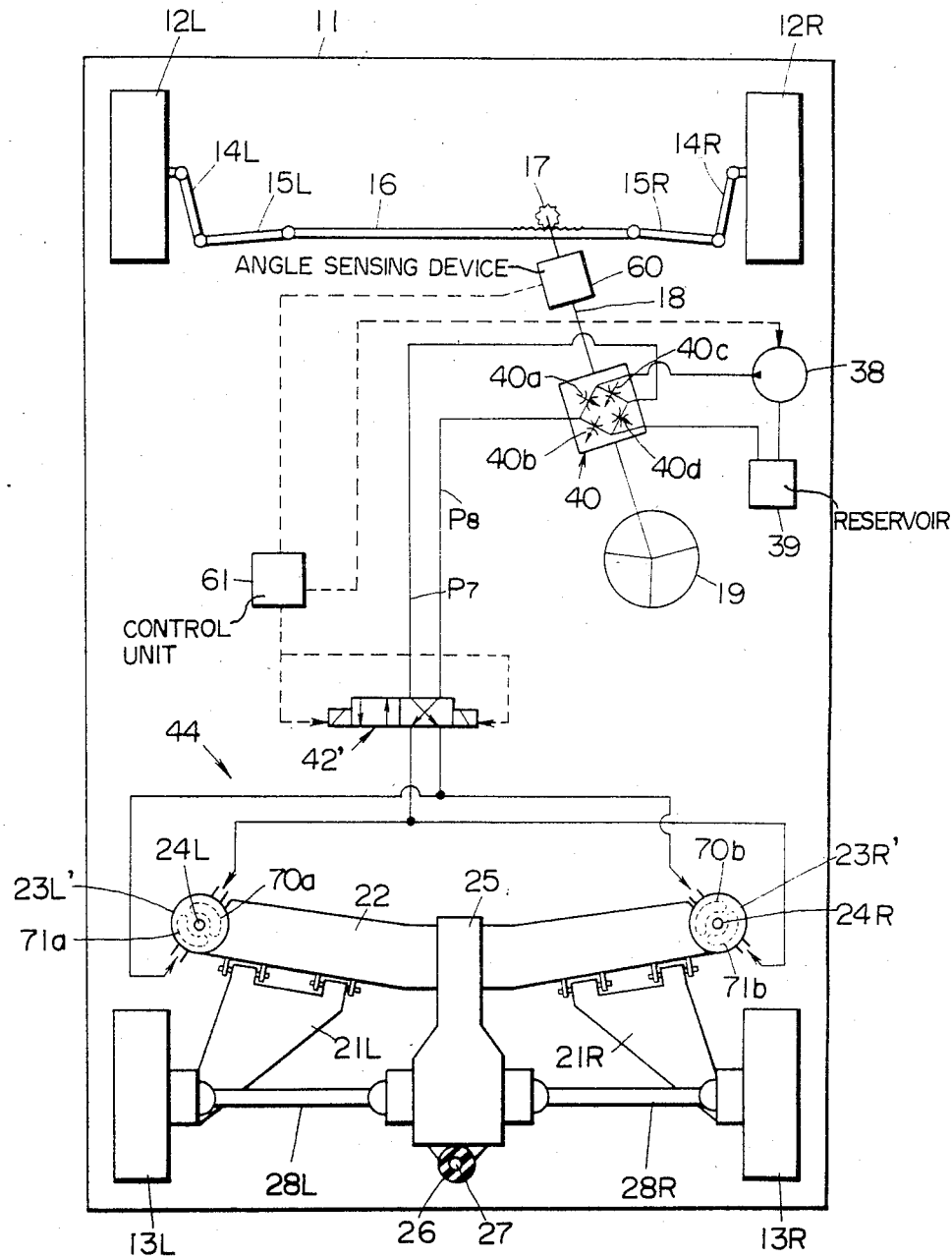
FIG. 10 is a schematic plan view of a fourth embodiment of the vehicle steering control system according to the present invention.

FIG. 10 illustrates a fourth embodiment of the vehicle steering control system of the present invention which is similar to the third embodiment with the exception that no hydraulic cylinder is used in the rear wheel control means 44. In this embodiment, the elastomeric insulator 23L is hollow and formed therein with first and second fluid chambers 70a, 71a to which the lines P7, P8 are directly connected, respectively. Similarly, the elastomeric insulator 23R is also hollow and formed therein first and second fluid chambers 70b, 71b to which the lines P8, P7 are directly connected, respectively. Thus, the elastomeric insulators 23L, 23R of this embodiment serve as actuators for causing the rear wheels 13L, 13R to turn.

Figure 11:
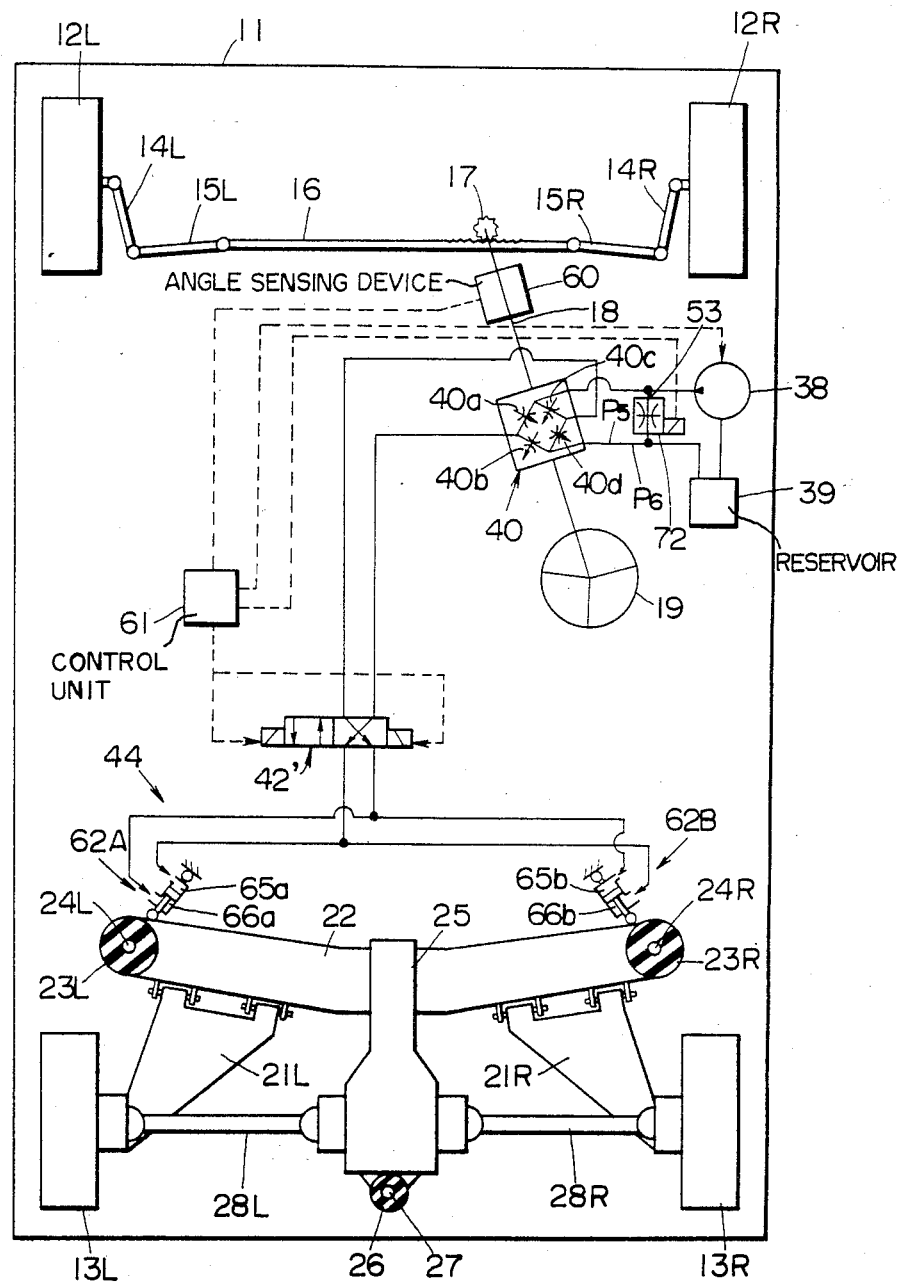
FIG. 11 is a schematic plan view of a fifth embodiment of the vehicle steering control system according to the present invention.

FIG. 11 illustrates a fifth embodiment of the vehicle steering control system of the present invention similar to the third embodiment except for a flow control valve 72 for controlling the flow amount of the hydraulic fluid supplied from the hydraulic pump 38 to the control valve 40. In this embodiment, the flow control valve 72 is disposed in the bypass line or passage 53 connecting the line P5 and the line P6. The line P5 connects the hydraulic pump 38 to the control valve 40 while the line P6 connects the control valve 40 to the reservoir 39. The flow control valve 53 is electrically connected to the control unit 61 and adapted to adjust the flow amount of the hydraulic fluid flowing to the control valve 40. In other words, although the particular steering wheel rotation angle at which the discharge amount of the hydraulic pump 38 becomes zero is set at $\alpha_0$, in the embodiment of FIG. 7, it can be varied to a desired value in this embodiment, thus increasing freedom in selecting the value of such a particular steering wheel rotation angle.

While turning of the rear wheels 13L, 13R of the above-discussed embodiments have been shown and described as being controlled in response to the steering effort applied to the steering wheel 19 or the steering or rotation angle of the steering wheel, it will be understood it may be controlled in response to other vehicle operating parameters.

Although change of the turning directions of the rear wheels 13L, 13R (i.e., in the same direction or the opposite direction relative to the turning direction of the front wheels 12L, 12R) has been shown and described as being carried out in response to vehicle speed or the rotation angle of the steering wheel, it will be appreciated that the rear wheel turning direction change may be carried out in response to other vehicle operating parameters or otherwise at any time when a driver requires upon operating a manual switch to generate a signal for changing the rear wheel turning directions. That is, the rear wheel turning direction change may be accomplished by any means capable of changing the rear wheel turning direction upon the flow amount of the hydraulic fluid to be supplied to the rear wheel control means becoming substantially zero.

What is claimed is:

1. A method of operating a vehicle steering control system including means for providing hydraulic fluid under pressure, rear wheel control means for controllably turning rear wheels in one of first and second directions under influence of the hydraulic fluid from the hydraulic fluid providing means in response to steering effort applied to a steering wheel, the first and second directions being opposite to each other relative to their neutral position in which the steering wheel is in its straight ahead position, flow control means for changing flow characteristics of the hydraulic fluid from the hydraulic fluid providing means to the rear wheel control means, the flow control means capable of substantially stopping supply of the hydraulic fluid to the rear wheel control means, and means for causing turning direction of the rear wheels to change between the first and second directions when operated, said method comprising a step of operating said causing means upon said flow control means substantially stopping the supply of hydraulic fluid to the rear wheel control means.

2. A method as claimed in claim 1, wherein said rear wheel control means includes a first actuator for turning the rear wheels in the first direction under the influence of the hydraulic fluid supplied thereto, and a second actuator for turning the rear wheels in the second direction under the influence of the hydraulic fluid supplied thereto, wherein said flow control means capable of substantially stopping the supply of the hydraulic fluid to said first and second actuators, wherein said causing means includes directional control means for changing flow direction of the hydraulic fluid from said hydraulic fluid providing means between a first flow direction to direct the hydraulic fluid to said first actuator and a second flow direction to direct the hydraulic fluid to said second actuator when actuated, wherein the operating step includes a step of actuating said directional control means upon substantially stopping the supply of the hydraulic fluid to said first and second actuators.

3. A vehicle steering control system comprising:

means for providing hydraulic fluid under pressure;

rear wheel control means for controllably turning rear wheels in one of first and second directions under influence of the hydraulic fluid from said hydraulic fluid providing means in response to steering effort applied to a steering wheel, the first and second directions being opposite to each other relative to their neutral position in which the steering wheel is in its straight ahead position;

flow control means for changing flow characteristics of the hydraulic fluid from said hydraulic fluid providing means to said rear wheel control means, said flow control means capable of substantially stopping supply of the hydraulic fluid to said rear wheel control means; and means for causing turning direction of the rear wheels to change between the first and second directions upon substantially stopping supply of the hydraulic fluid to said rear wheel control means.

4. A vehicle steering control system as claimed in claim 3, wherein said rear wheel control means includes a first actuator for turning the rear wheels in the first direction under the influence of the hydraulic fluid supplied thereto, and a second actuator for turning the rear wheels in the second direction under the influence of the hydraulic fluid supplied thereto.

5. A vehicle steering control system as claimed in claim 4, wherein said flow control means changes the flow characteristics of the hydraulic fluid from said hydraulic fluid providing means to said first and second actuators, wherein said flow control means substantially stopping the supply of the hydraulic fluid to said first and second actuators.

6. A vehicle steering control system as claimed in claim 5, wherein said causing means is directional control means for changing flow direction of the hydraulic fluid from said hydraulic fluid providing means between a first flow direction to direct the hydraulic fluid to said first actuator and a second direction to direct the hydraulic fluid to said second actuator upon substantially stopping the supply of the hydraulic fluid to said first and second actuators.

7. A vehicle steering control system as claimed in claim 6, wherein said flow control means includes a control unit for controlling the flow characteristics of the hydraulic fluid in response to a vehicle operating parameter, in which flow amount from said hydraulic fluid providing means to said first and second actuators becomes substantially zero when said vehicle operating parameter is at a predetermined level.

8. A vehicle steering control system as claimed in claim 7, wherein said directional control means changes the flow direction of the hydraulic fluid when said vehicle operating parameter is at said predetermined level.

9. A vehicle steering control system as claimed in claim 8, wherein said directional control means includes a directional control valve having a first position for directing the hydraulic fluid from said hydraulic fluid providing means to said first actuator and a second position for direction the hydraulic fluid from said hydraulic fluid providing means to said second actuator, the first and second positions being interchangeable when said vehicle operating parameter is at said predetermined level.

10. A vehicle steering control system as claimed in claim 9, wherein said vehicle operating parameter is vehicle speed.

11. A vehicle steering control system as claimed in claim 10, wherein said predetermined level is within a range from 30 Km/h to 60 Km/h.

12. A vehicle steering control system as claimed in claim 10, further comprising a front wheel operating means for controllably turning front wheels under influence of the hydraulic fluid from said hydraulic fluid providing means in response to the steering effort applied to the steering wheel, said front wheel operating means including a power cylinder for assist turning the front wheels under the influence of the hydraulic fluid, said power cylinder forming part of a power steering system.

13. A vehicle steering control system as claimed in claim 12, wherein said first and second actuators of said rear wheel control means form part of a compliance steer control system.

14. A vehicle steering control system as claimed in claim 13, wherein said hydraulic fluid providing means includes a first hydraulic pump fluidly connectable with said first and second actuators of said rear wheel control means, and a second hydraulic pump fluidly connectable with said power cylinder of said front wheel operating means.

15. A vehicle steering control system as claimed in claim 14, wherein said control unit includes a control circuit for controlling the flow characteristics of the hydraulic fluid in a manner that the flow amount of the hydraulic fluid to said first and second actuators becomes zero at a predetermined vehicle speed, and a control circuit for controlling said directional control valve in a manner that said first and second positions are interchangeable at said predetermined vehicle speed.

16. A vehicle steering control system as claimed in claim 15, wherein said control unit includes a control circuit for controlling the flow characteristics of the hydraulic fluid from said hydraulic fluid providing means to said power cylinder in a manner that flow amount of the hydraulic fluid is smaller in a high vehicle speed range than in a low vehicle speed range.

17. A vehicle steering control system as claimed in claim 16, wherein said first mentioned control circuit of said control unit is arranged to directly control discharge characteristics of said first hydraulic pump, and said third mentioned control circuit of said control unit is arranged to directly control discharge characteristics of said second hydraulic pump.

18. A vehicle steering control system as claimed in claim 17, further comprising a first flow control valve for controlling the flow amount of the hydraulic fluid from said first hydraulic pump to said first and second actuators in response to said vehicle speed, a second flow control valve for controlling the flow amount of the hydraulic fluid from said second hydraulic pump to said power cylinder in response to said vehicle speed.

19. A vehicle steering control system as claimed in claim 18, wherein said first flow control valve is adapted to control flow amount of the hydraulic fluid to become zero at said predetermined vehicle speed, and said second flow control valve is adapted to control the flow amount of the hydraulic fluid to be lower in a high vehicle speed range than in a low vehicle speed range.

20. A vehicle steering control system as claimed in claim 9, wherein said vehicle operating parameter is rotational angle of the steering wheel.

21. A vehicle steering control system as claimed in claim 20, wherein said hydraulic fluid providing means includes a hydraulic pump fluidly connected to said first and second actuators of said rear wheel control means.

22. A vehicle steering control system as claimed in claim 21, said control unit controls said hydraulic pump in a manner that the flow amount of the hydraulic fluid to said first and second actuators becomes zero at a predetermined level of the steering wheel rotational angle.

23. A vehicle steering control system as claimed in claim 22, wherein said control unit controls said hydraulic pump in a manner that the flow amount of the hydraulic fluid to said first and second actuators is capable of being larger than in a large steering wheel rotational angle range larger than said predetermined level than in a small steering wheel rotational angle range smaller than said predetermined level.

24. A vehicle steering control system as claimed in claim 23, further comprising a flow control valve for controlling the flow amount of the hydraulic fluid to be supplied from said hydraulic pump to said first and second actuators in response to the rotational angle of the steering wheel.

* * * * *